Dec. 3, 1940. P. L. THURSTON ET AL 2,223,750
PROCESS OF KNITTING
Original Filed Feb. 15, 1939 6 Sheets-Sheet 1
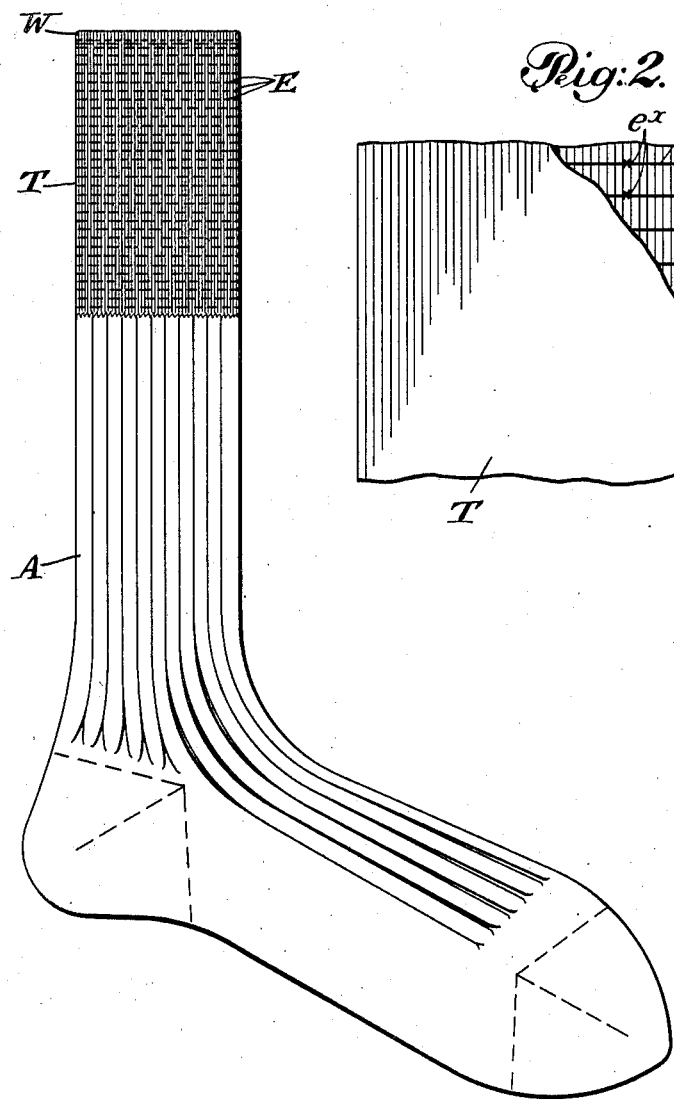
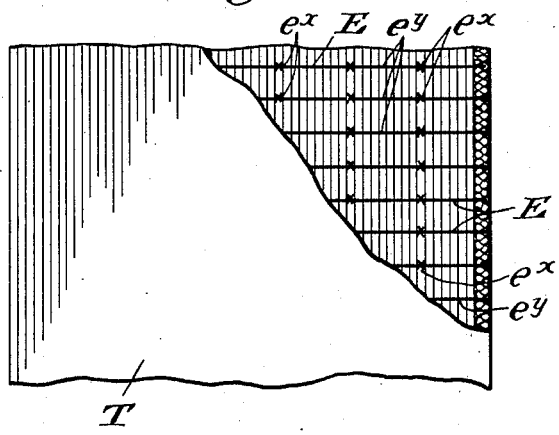

Dec. 3, 1940. P. L. THURSTON ET AL 2,223,750
PROCESS OF KNITTING
Original Filed Feb. 15, 1939 6 Sheets-Sheet 2

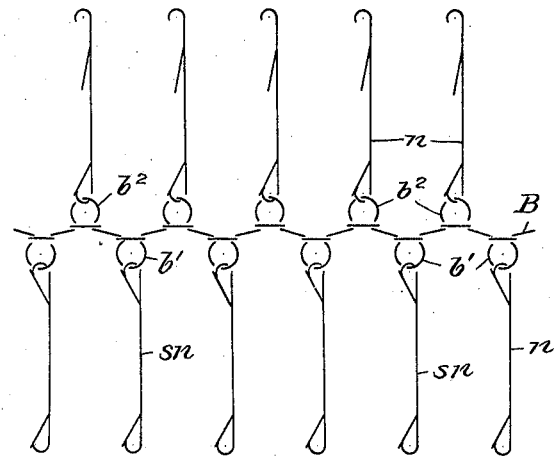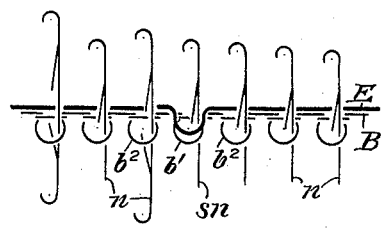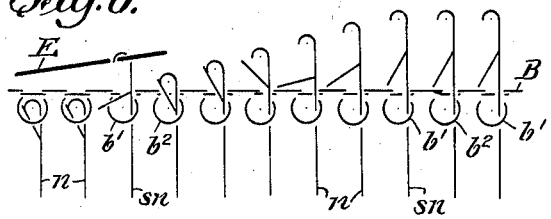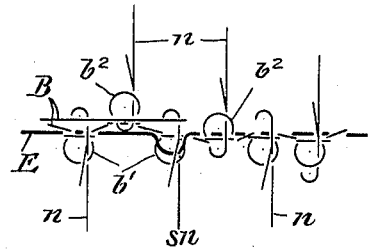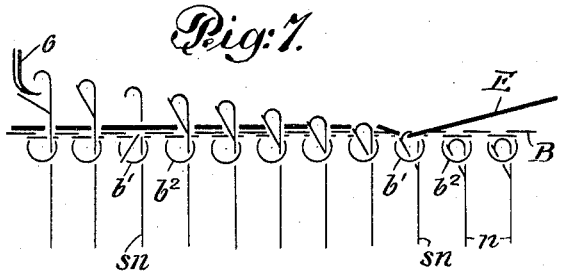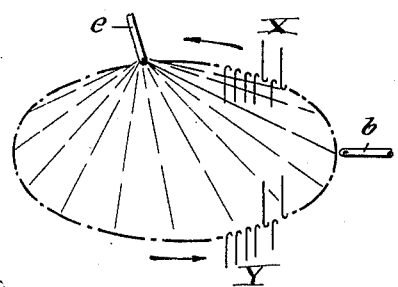

Dec. 3, 1940.  P. L. THURSTON ET AL  2,223,750
PROCESS OF KNITTING
Original Filed Feb. 15, 1939    6 Sheets-Sheet 4

Paul L. Thurston and
Leon B. Wilcox  INVENTORS
BY Louis Brewood Whitaker
ATTORNEY Patented Dec. 3, 1940

2,223,750

UNITED STATES PATENT OFFICE 2,223,750

PROCESS OF KNITTING

Paul Leslie Thurston, Martinsburg, W. Va., and Leon B. Wilcox, Westfield, N. J., assignors to Interwoven Stocking Company, New Brunswick, N. J., a corporation of New Jersey Original application February 15, 1939, Serial No. 256,416. Divided and this application June 22, 1939, Serial No. 280,436

11 Claims. (Cl. 66—14)

Our invention consists in the novel features hereinafter described, reference being had to the accompanying drawings which show several embodiments of our invention selected by us for purposes of illustration, and our invention is fully disclosed in the following description and claims.

Our invention consists in the process of knitting a new self-supporting rib knitted fabric. Such fabric finds its greatest use in the top portion of the leg of a stocking, sock or anklet for the purpose of causing it to support itself on the leg of the wearer without the use of a garter or garter band, and without undue or uncomfortable pressure on the leg.

The fabric produced by our improved process is not specifically claimed herein as it forms the subject matter of a separate application for Letters Patent, filed by us February 15, 1939, and given Serial No. 256,416, of which this application is a division.

For many years it has been customary to provide hosiery and particularly socks and anklets with tops formed of rib knitting usually 1 x 1 rib, whether the remainder of the leg portion is formed of plain knitting or rib knitting, in order to secure the form-fitting effect which is provided by rib knitting which, by reason of its structure, in which a portion of the wales project from the inner face of the fabric, while other wales alternating with the inner wales project from the outer face of the fabric, and thus reduce the diameter of the fabric, and increase the elasticity and recoverability thereof, which permits the top portion to be stretched as it is drawn over the heel, and fit snugly upon the leg thereafter. Rib fabric, however, is not self-supporting as the vertically disposed ribs on the inner face of the fabric acts like sleigh runners, tending to cause the rib knit tops to slide downwardly and necessitate the use of some form of garter. It has been proposed to incorporate elastic thread into the courses of rib knitting forming the stocking top, but as rib knitting is produced by two series of needles, forming respectively the inner and outer wales, the elastic thread has been "laid in," that is to say, fed between the inner and outer wales, during the knitting of the courses containing it. Whether the elastic thread is "laid in" in separated or consecutive courses, it occupies a central position between the outer and inner wales, and is held out of contact with the skin of the wearer by the inner wales so that it can only act by exerting a compressing force upon the leg of the wearer, which must be very considerable to contribute any self-supporting effect, and these fabrics have not been entirely satisfactory in providing a self-supporting sock or stocking.

According to our invention, an elastic thread is incorporated in a rib fabric, in an entirely novel manner by uniting it to the fabric at spaced points in each course of the fabric containing it, preferably during the process of knitting, and floating the elastic thread on the inner face of the rib fabric across one or more of the inner ribs or wales, between the points at which it is united to the fabric. The floated portions of the elastic thread which may be of rubber, or preferably the well known "Lastex," will therefore come directly into contact with the skin of the wearer, and as they extend horizontally and are distributed around the inner face of the fabric, they will slightly indent the skin of the wearer and form an interlocking engagement therewith transversely to the direction in which the stocking tends to slide, i. e., downwardly. It has been found that by introducing elastic thread in this manner, in a plurality of courses, so that the floats in each course may separately and independently indent the skin of the wearer and interlock therewith, and by providing a sufficient number of such elastic thread bearing courses, the rib top is made perfectly self-supporting with such a minimum tension on the elastic thread when distended that the wearer is not conscious of any pressure, and no discomfort is produced. For purposes of economy, as the elastic thread adds to the expense of the fabric, it has been found that by introducing the elastic thread in every fourth course, under light tension, and uniting it into the fabric at separated points and floating it across the inner faces of one, two, three, four or more of the inwardly extending ribs or wales, a thoroughly satisfactory self-supporting rib knit top for a stocking, sock or anklet can be obtained. We do not limit ourselves however to any particular spacing of the points of attachment of the elastic thread, in each course containing it, nor to any particular spacing of the courses containing the elastic thread incorporated in the above described manner as these particulars may be varied according to the nature of the article, and the particular yarn or yarns of which the rib fabric is formed, and otherwise according to the ideas of different manufacturers. In order to unite the elastic thread to the fabric in the elastic bearing courses, we preferably feed it to selected needles of one or other of the two series of needles which cooperate in the formation of the rib fabric, that is to say, to selected needles of the series forming the outer wales, or to selected needles of the series forming the inner wales. The elastic thread may also be fed to the selected needles below the latches thereof, and united to the fabric without directly forming the elastic thread into a stitch, or it may be fed to the hooks of such selected needles in addition to the body thread, in plating relation therewith, or it may be fed to the hooks of the selected needles, so as to cause them to draw loops of the elastic thread through previously formed loops of body thread which are then cast off in any one of which cases the elastic thread will be united to the fabric at or adjacent to the wales formed by said selected needles. In all cases the elastic thread is floated between the selected needles across the inner ribs or wales located between the points at which it is united to the fabric.

Referring to the accompanying drawings,

Fig. 1 is a view in elevation of a sock having a top portion of 1 x 1 rib and having an elastic thread incorporated therein by uniting it to the fabric at separated points in each of certain, preferably spaced, courses, and floating it on the inside of the fabric and across the inner faces of one or more intervening inwardly extending rib wales.

Fig. 2 represents an enlarged view of a portion of the top, broken away, and showing the interior thereof.

Fig. 5 is a diagrammatic view illustrating the operation of the needles in the upper and lower cylinders during a portion of the revolution of the cylinders for producing the ordinary rib work.

Fig. 6 is a similar view representing the position of the needles after transferring the needles of the upper cylinder to the lower cylinder and before feeding the elastic thread.

Fig. 7 is a similar view showing the feeding of the elastic thread to selected needles.

Fig. 8 is a similar view illustrating the position of the needles during another portion of the revolution of the cylinders immediately before the needles of the upper cylinder are re-transferred thereto.

Fig. 9 is a similar view showing the needles of the upper cylinder transferred thereto, and the elastic thread incorporated in the fabric and floated on the interior thereof.

Fig. 10 is a diagrammatic view illustrating the positions of the needles with respect to the upper and lower cylinders through the various portions of the revolution of the cylinders, dotted lines showing the manner in which the elastic thread is carried around between the upper and lower cylinders during the formation of courses in which it is not incorporated.

With reference to the construction illustrated in Figs. 1 to 15, we have shown in Figs. 1 and 2, a sock indicated at A, and provided with a top portion T, of rib knitting, in this instance 1 x 1 rib, having elastic thread indicated at E, incorporated in a plurality of courses, in this instance spaced from each other by intervening courses not containing elastic thread, the elastic thread being united to the fabric at spaced points, indicated at ex, in Fig. 2, and floated, as at ey, on the inner faces of the fabric, and across the inner faces of intervening inner rib wales. The leg of the stocking is here shown as conventional 6 x 3 rib, but it may be of any desired type of knitting, as plain knitting, or other forms of rib knitting, as preferred.

Figure 4:
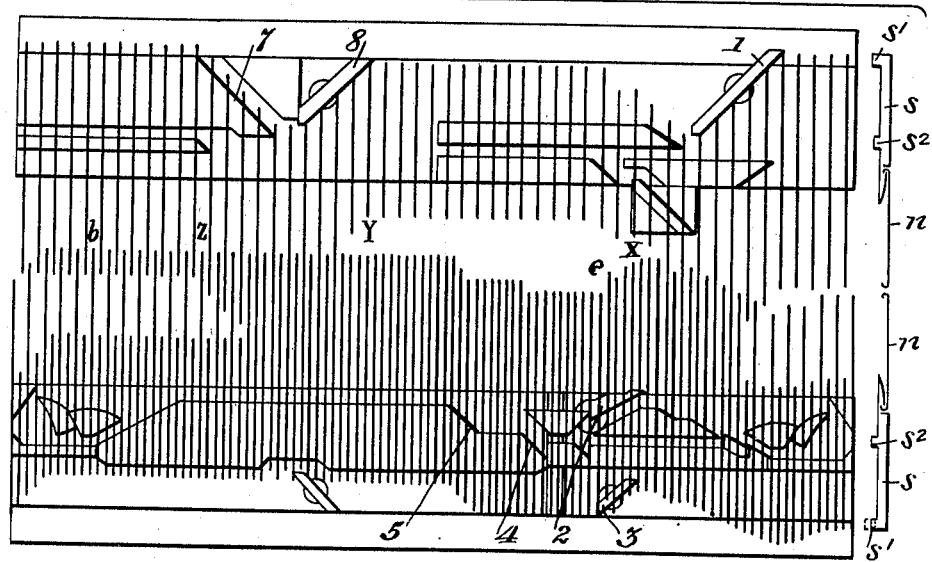
Fig. 4 represents a diagrammatic view of the upper and lower cylinders of the machine and the knitting and transfer cams laid out in a single plane, and showing at one end of the figure the double ended needles and sliders for operating the same.

While not limited thereto, we find it convenient to produce our improved fabric on a machine having vertical superposed co-axial cylinders, and employing needles provided with hook and latch at each end, as indicated at the right in Fig. 4, at $n$, each needle being provided with a slider $s$, having a transfer butt $s'$ and knitting butt $s^2$, as is customary in these machines. A suitable machine for the purpose is the well known "Komet" machine manufactured by the Bentley Engineering Company Komet Works, of Leicester, England, with certain modifications of its transfer and other cam mechanisms hereinafter referred to and illustrated in Fig. 4 sufficiently for a clear understanding of our present invention.

Figure 3:
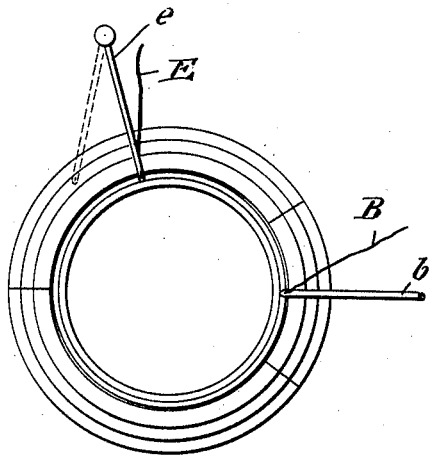
Fig. 3 is a plan view of the lower cylinder of a machine for making our improved fabric, illustrating the thread guides for feeding, respectively, body thread and elastic thread thereto.

Fig. 3 is a horizontal plan view of the lower cylinder for the purpose of indicating the locations with respect thereto of the thread feed finger b, which feeds the body thread B', and the thread feed finger e, which feeds the elastic thread E. The latter finger e, is preferably capable of movement into and out of operative position as indicated by the dotted line in Fig. 3, so that the feed of elastic thread may be discontinued at the conclusion of the formation of the top T, and beginning of the leg portion which is preferably knit integrally therewith, but which might be knit separately and attached thereto by looping, sewing or otherwise, if desired. Obviously, the elastic thread may be held in a suitable clamp and severed by a suitable cutter, if desired, but these instrumentalities are so usual that they are not illustrated herein.

In Fig. 4 the cylinders and cams of the machine are diagrammatically illustrated as if they were cut at a point located centrally of the main knitting wave and spread out into a plane, the location of the feed finger b, for the body thread, being indicated by the letter b, in this figure, and it will be noted that adjacent to the point of introduction of the body thread, a portion of the needles are in the upper cylinder while the remaining needles are in the lower cylinder. As the fabric being knit is disposed between the two cylinders, it will be seen that the needles in the upper cylinder are disposed at one side of the fabric, while the needles in the lower cylinder are disposed at the opposite side thereof. The relative number of needles in each cylinder is dependent on the type of rib, but for convenience of description we will assume that 1 x 1 fabric is being produced and therefore alternate needles will be in the upper cylinder, as shown and the intervening needles in the lower cylinder, adjacent to the introduction of the main knitting thread B, the needles being actuated by the knitting cams of both cylinders with the result that 1 x 1 rib knitting is produced as indicated in Fig. 5, the needles of the upper cylinder drawing the loops constituting the inwardly extending or inner rib wales and the needles of the lower cylinder drawing the loops constituting the outwardly extending or outer rib wales, in the ordinary manner.

As the needles pass the knitting wave, referring to the right hand portion of Fig. 4, the transfer butts of the slider s, of the upper cylinder needles encounter a transfer cam indicated at 1, which effects the transfer of the needles of the upper cylinder to the lower cylinder, while holding their loops and places them in operative engagement with sliders in the grooves of the lower cylinder. This position is indicated in Fig. 6. This occurs in every course of the top whether elastic thread is fed or not. As soon as this takes place, which is just previous to the point marked X, in Fig. 4, a needle separation is effected for the purpose of bringing selected needles of the lower cylinder only into a higher position than the adjacent needles, and while this could be accomplished in many ways, it is conveniently effected by drawing down the selected needles by means of a draw down cam, indicated at 2, acting on the knitting butts of their sliders, while the remaining needles are drawn down faster by means of a special draw down cam 3, acting on the transfer butts of their sliders. This is accomplished conveniently by providing the lower cylinder sliders for the non-selected needles with longer transfer butts than the sliders for the non-selected needles. The selecting cam 3, is at this point moved inwardly far enough to engage the long butts only and will therefore miss the short butts of the sliders for the selected needles sn, and will drawn down the non-selected needles, which the cam 2, which is of less pitch acts on the knitting nibs of the sliders for the selected needles and draws them down more slowly, so that by the time they reach the feed finger for the elastic thread E, the selected needles are above the level of the non-slected needles and take the elastic thread in their hooks while the non-selected needles being at a lower level, do not take it.

The needles are thereafter brought to a common level which has the effect of bringing the non-selected needles in front of the elastic thread. The selected needles may be separated by one or more intermediate needles, but as shown herein, the selected needles will be those which operate at all times in the lower cylinder.

In the present instance, as indicated in Fig. 7, for example, we have shown the selected needles sn, separated by five intervening non-selected needles, but the particular number is not important. It merely serves to determine the length of the floats which are formed between the points at which the elastic thread is united to the fabric.

As the needles are drawn down through the loops of body thread held thereon, their latches will be closed as indicated in Fig. 7, but they are not drawn downward far enough to cast off the previously formed stitches, and are then raised by the riser cams.

All the needles are now raised by riser cams 4 and 5, similar to shedding cams. As the selected needles rise, the elastic thread will open their latches and they are raised to a height to bring the elastic thread below the latches of the selected needles as shown in Fig. 8. In the case of the non-selected needles which rise through their loops, at the same time as the selected needels, their being no thread in the hooks, we provide a latch opener, indicated at 6, in Fig. 7, for example, to ensure the opening of all the latches as the cylinder rotates. This is necessary in order that the upper hooks of the needles of the upper cylinder shall be in position to be engaged by the sliders in the upper cylinder to retransfer them to the upper cylinder. When the cylinders have rotated to the point marked Y in Fig. 4, the sliders for the upper cylinder needles will be moved downwardly by a transfer cam, indicated at 6, into position to engage the alternate needles which are to be transferred back to the upper cylinder, and a complementary transfer cam indicated at 7, will raise the sliders for the upper cylinder needles, thus again bringing them into operative position in the upper cylinder, at the point marked Z, Fig. 4, in accordance with the normal operation of such machines. This will transfer the loops carried by the needles of the upper cylinder to the lower hooks thereof, as indicated in Fig. 9, and as this takes place, these loops will be carried around the elastic thread on each side of the selected needles sn, so as to unite the elastic thread into the fabric at the sinker wales adjacent thereto, and restore the needles to the condition illustrated in Fig. 5, when they are again to receive the body thread B, from the feed finger b, and are in condition to knit another course of rib knitting. Each selected needle sn, which belongs to the group of intervening needles in the cylinder, now carries the body thread below the latch thereof and takes a loop of body thread at the main knitting wave, drawing it through the previously formed loop, while the elastic thread passes up over the latch without forming a stitch thereof. The elastic thread may be introduced in each course of rib knitting in the manner previously described, but as this is unnecessary, and the elastic thread adds to the cost of the stocking, we prefer to introduce it into spaced courses only as for example, every fourth course. In the next succeeding course after the introduction of the elastic thread in the manner previously described, it is only necessary to move the selecting cam 3, inward far enough to engage not only the longer butts of the sliders for the non-selected needles, but also the short butts of the sliders for the selected needles, thereby drawing all of the needles down to the same extent which prevents the selected needles from receiving the elastic thread and makes it unnecessary to move the elastic thread feed finger e, from its normal feed position. Any desired number of intervening courses without the elastic thread can thus be knit, in this instance three, as shown, and hereafter described, and when it is desired to again introduce the elastic thread it is only necessary to partially withdraw the selecting cam 3, to the position first described, in which it will act only on the butts of the sliders for the non-selected needles, when the elastic thread will be incorporated in the manner previously described.

It will be seen that, with special reference to Fig. 10, as the needles of the upper cylinder are transferred to the lower cylinder from the point marked X in Fig. 10, around in the direction of the arrows, to the point marked Y, in Fig. 10, it is not necessary to cut and clamp the elastic thread of the previous course in which it is incorporated, as it will be carried around in the manner indicated by the dotted lines in Fig. 10, over the tops of the needles without interfering therewith.

Figure 11:
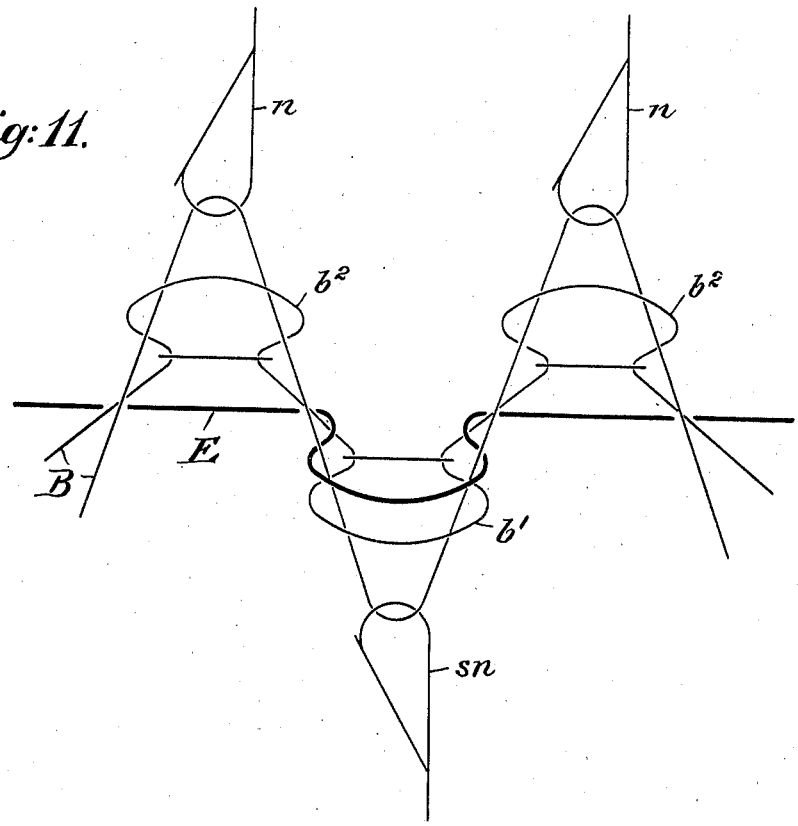
Fig. 11 is an enlarged diagrammatic view representing the manner in which the elastic thread is incorporated in the fabric in accordance with the preceding figures.
Figure 12:
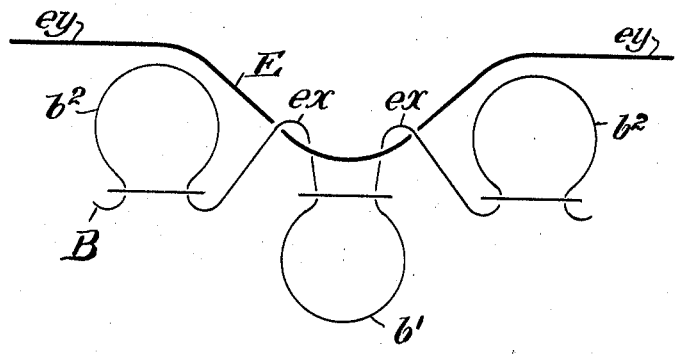
Fig. 12 is an enlarged diagrammatic horizontal sectional view of the inner and outer rib wales indicated in Fig. 11 and showing the relation of the elastic thread thereto.

In Figs. 11 and 12, we have shown, diagrammatically, the manner in which the elastic thread is incorporated as previously described. In Fig. 11, sn, represents one of the selected needles of the lower cylinder series, drawing a body thread B, through a preceding loop b', of body thread, previously carried thereon and casting off the elastic thread E, while the needles n, of the upper cylinder series are drawing loops of the body thread through the previously formed loops b², the elastic thread being united to the fabric as shown by the engagement with the sinker loops ex, as best seen in Fig. 12. It will thus be seen that the elastic thread is united to the fabric by the sinker loops of the stitches b', forming part of an outer wale of the fabric, while the floats indicated at ey, extend across the inner faces of the inner wales indicated at B² in Fig. 12.

Figure 13:
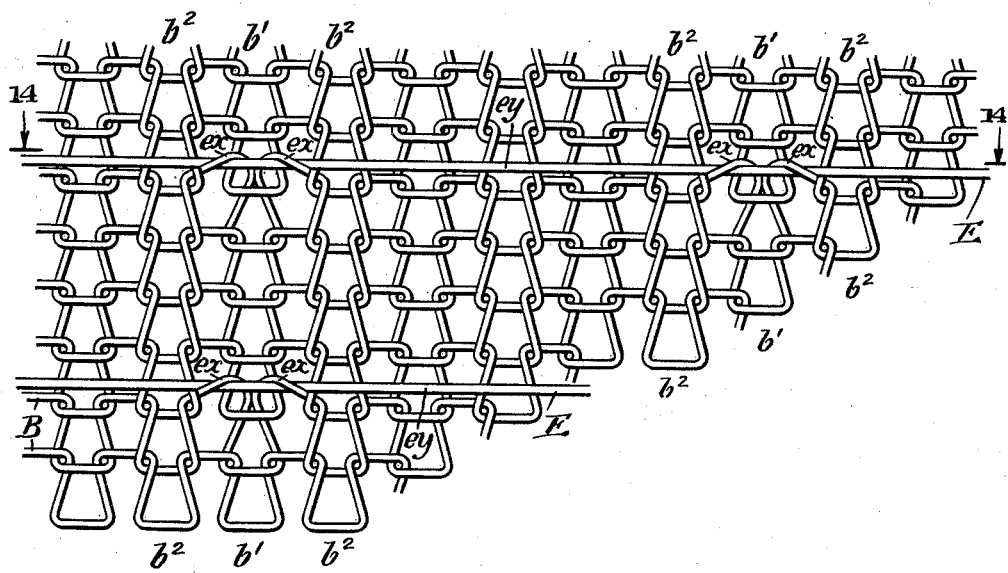
Fig. 13 is a diagrammatic representation of the interior of the rib fabric formed in the manner indicated in the preceding figures.
Figure 14:
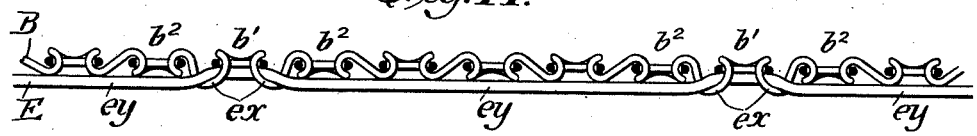
Fig. 14 is a diagrammatic horizontal sectional view of the fabric illustrated in Fig. 13 taken on line 14—14 thereof.
Figure 15:
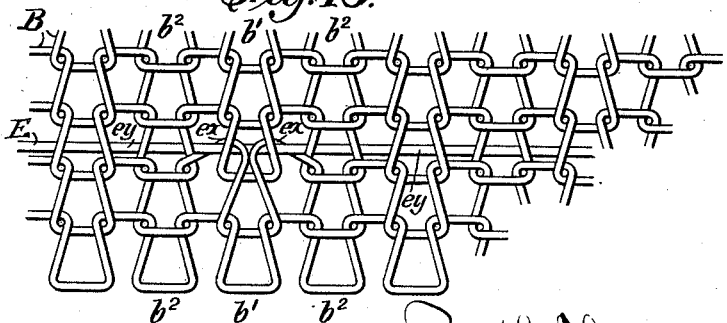
Fig. 15 is a view similar to Fig. 13, but showing the outer face of the rib fabric.

Figure 13 is a detailed diagrammatic view representing the interior face of the rib fabric in which the elastic thread E, is clearly shown in spaced courses separated by three intervening courses not containing the elastic thread, and united to the fabric by the sinker wales of stitches forming parts of the exterior wales b'—b' spaced from each other in each course, and providing floats ey, extending from one point of union to another, and passing across the inner faces of intervening inwardly extending wales b²—b² of the fabric. The construction is also illustrated graphically in Fig. 14, which represents a cross section of the fabric on the line 14—14 of Fig. 13. It is also illustrated in Fig. 15, which shows the fabric in a manner similar to Fig. 13, but viewed from the outer face of the fabric.

Figure 16:
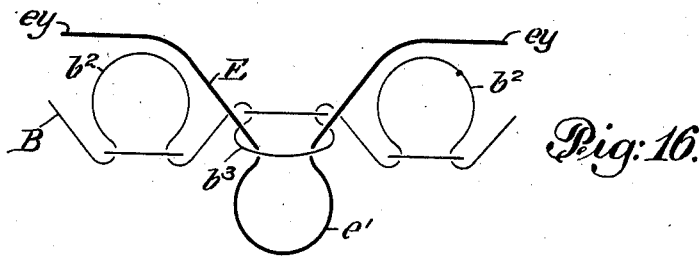
Fig. 16 is a view similar to Fig. 12 showing a slight modification in which the elastic thread is drawn by the selected needles through the preceding loop of body thread to form part of one of the exterior wales of the fabric at each point of union therewith.

Fig. 16 is a view similar to Fig. 12, showing a slight modification of our invention, in which the elastic thread instead of being cast off by the selected needles, is drawn down far enough after taking it, and by means of a suitable cam acting on the knitting butts of the sliders for the selected needles, so that they are drawn down further than the non-selected needles to cast off the previously held loop indicated at b³, in Fig. 16, of body thread and form a loop e', of the elastic thread E, which forms a part of the exterior wales produced by each selected needle. This will secure the elastic thread at spaced exterior wales in the rib fabric and permit the floats indicated at ey, to extend along the inner face of the fabric and across the inner faces of the inner wales indicated at b², in the same manner as previously described.

Figure 17:
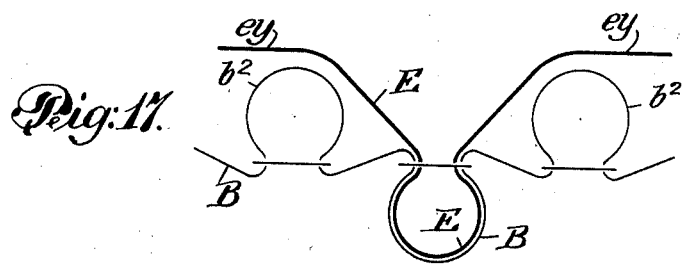
Fig. 17 is another view similar to Fig. 12 showing another slight modification in which the body thread and also the elastic thread are both fed to the hooks of the selected needles and drawn into loops in plated relation at the points of union therewith.

Fig. 17 represents another slight modification of the invention in which the elastic thread, after being fed to the selected needles is not raised far enough by the cams 4 and 5 to lift the latches above the elastic thread so that the elastic thread remains in the hook of the selected needles, which, during the knitting of rib work after the needles of the upper cylinder have been retransferred thereto, will receive the body thread B, in plating relation thereto, as clearly indicated in Fig. 17, thus causing the selected needles when passing through the main knitting wave to draw stitches containing both the body thread B, and the elastic thread E, and uniting the elastic thread to the fabric at the selected spaced outer wales represented by the selected needles. In this case also the floated portions ey, of the elastic thread will extend on the inner face of the fabric and across the inner faces of intervening inwardly extending wales b²—b².

In all of the forms of our invention, previously described, it will be seen that the elastic thread is introduced into separated or spaced courses of the top fabric and is united to the fabric in each of such courses at separated exterior wales and floated on the inner face of the fabric and across intervening inwardly extending wales of the rib fabric in position to come directly into contact with the skin of the wearer and by slightly embedding the same, will interlock therewith and support the top of the stocking and the leg of the stocking firmly in position on the leg of the wearer. It will be understood that the elastic thread is fed under sufficient tension to accomplish this result.

Rib work has a tendency to contract very materially in diameter, as it leaves the needles of the knitting machine, and it is necessary therefore to feed the elastic thread under sufficient tension so that as the rib work contracts, no slack will exist in the floats of the elastic thread in the undistended condition of the fabric. As a matter of fact, the elastic thread may be fed under a greater tension than is necessary to accomplish this result, so that it will exert some tension upon the fabric when in the undistended condition, more or less in accordance with the desire of the manufacturer and the particular type of sock or anklet or stocking of which the self-supporting top is to form a part. For example, the tension on the elastic thread may be sufficient to draw the outer and inner wales into close contact or closer contact than would be effected by the natural rib structure, if that is desired, but such increased tension is not essential in carrying out our invention, as the elastic threads will be necessarily placed under sufficient tension to effect the self-supporting function when the fabric is distended and placed over the leg of the wearer, the portions of the leg engaged being ordinarily of greater diameter than the diameter of the top when in undistended condition.

It will be understood also that when the rib top has been completed, and it is desired to discontinue further feeding of the elastic thread through the remaining portion of the leg, the feed finger e, for the elastic thread will be swung to its inoperative position, indicated in dotted lines in Fig. 3, where it will ordinarily be caught by a suitable clamp and severed by a suitable cutter (not shown), in a well known manner, in order that the sock may be completed by knitting the leg and foot in the usual manner.

It will be understood that in beginning the knitting of the top, a welt indicated at W, in Fig. 1, may be formed in any suitable manner, as for example, in accordance with the disclosures of the application of Miller, Thurston and Poole, Serial Number 206,464, filed May 6, 1938, now Patent No. 2,161,880, or a welt may be provided by turning the fabric over and stitching, or in any other desired manner, such welt forming no part of our present invention.

While we have shown herein and previously described the formation of the fabric by uniting the elastic thread in the fabric at spaced outer wales thereof, the cam mechanism of the machine may be so constructed and arranged as to unite the elastic thread in either one of the three ways previously described at separated inner wales of the rib fabric and floating it on the inner face of the fabric and across intervening inner rib wales thereof. Thus, in Fig. 18, we have illustrated a construction of fabric similar to that shown in Fig. 12, except that the elastic thread E, is secured to the fabric by the sinker wales $ex$, of one of the inner rib wales indicated at $b^2$, the exterior rib wales being indicated at $b'$, and the floated portions of the elastic thread indicated at $ey$, being carried along the inner face of the fabric in each course containing it and across the inner faces of intervening inner rib wales $b^2$.

Figure 18:
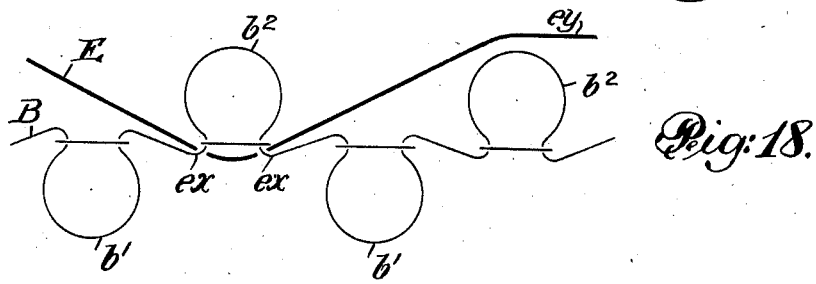
Fig. 18 is a view similar to Fig. 12 showing the elastic thread secured to the fabric by selected needles in the upper cylinder which form the inner rib wales of the fabric, and floated on the inner faces of the fabric and across the intervening inner rib wales.
Figure 19:
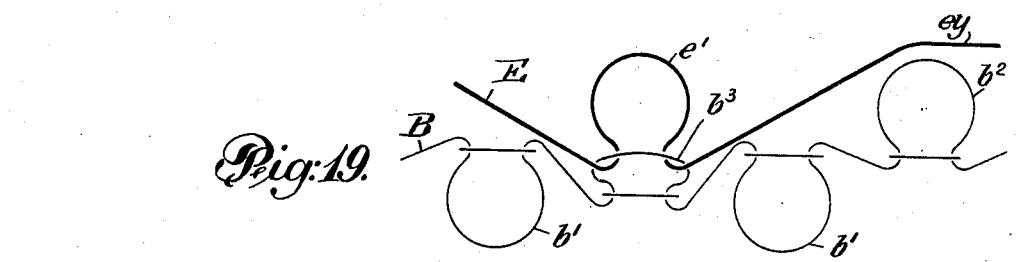
Fig. 19 is a view similar to Fig. 18 showing a slight modification in which the selected needles in the upper cylinder draw the elastic thread through a previously held loop of body thread to form a loop constituting part of spaced inner rib wales at which the elastic thread is united to the fabric.

Fig. 19 represents a view similar to Fig. 18, except that corresponding to the construction illustrated in Fig. 16, the elastic thread is drawn through the previously formed loop of body thread indicated at $b^3$, to form a stitch $e'$, constituting part of one of the interior rib wales of the fabric, the floated portions $ey$, being carried around the inner face of the fabric and across the inner wales, one of which is indicated at $b^2$.

Figure 20:
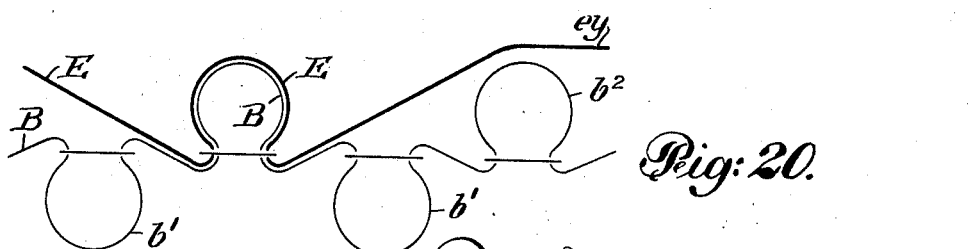
Fig. 20 is a view similar to Fig. 18 and Fig. 19 showing a further modification in which the selected needles of the upper cylinder draw a loop of body thread and the elastic thread in plated relation at the spaced points at which the elastic thread is united to the fabric.

Fig. 20 illustrates a construction of fabric somewhat similar to that shown in Fig. 17 in which the elastic thread E, in plating relation with the body thread B, forms stitches constituting portions of the separated inner wales of the fabric, the floated portions of the elastic thread indicated at $ey$, being as in every case, carried around the inner face of the fabric and across the inner faces of intervening inner rib wales thereof.

What I claim and desire to secure by Letters Patent is:

1. The herein described process for the manufacture of a self-supporting rib knit top for an article of hosiery by the aid of a circular knitting machine provided with superimposed axially disposed cylinders, needles provided with hooks at both ends and means for transferring the needles from one cylinder to the other, which consists in feeding a body thread to needles in both cylinders, during part of the revolution of the cylinders, transferring the upper cylinder needles to the lower cylinder, bringing certain of the lower cylinder needles to a higher level than the remaining needles, and feeding thereto an elastic thread to unit said elastic thread to the rib knit fabric, bringing said needles to a common level, and restoring the upper cylinder needles to the upper cylinder all during other portions of a revolution of the cylinders.

2. A process of knitting a self-supporting rib knit top for an article of hosiery by means of a knitting machine having opposed co-axial cylinders and needles provided with hooks at opposite ends, which consists in assembling certain of the needles in one cylinder, and intervening needles in the other cylinder during a portion of the revolution of the cylinders, and feeding a body thread to the needles in both cylinders to form rib work, transferring all of the needles of one cylinder to the other cylinder during another portion of the revolution of said cylinders, and while all the needles are in the one cylinder, effecting a needle separation of spaced selected needles, and feeding thereto an elastic thread floating said elastic thread on the inner face of the fabric and across the inner faces of intervening inner rib wales of the fabric, and then restoring to the other cylinder the needles transferred therefrom.

3. A process of knitting a self-supporting rib knit top for an article of hosiery by means of a knitting machine having opposed co-axial cylinders and needles provided with hooks at opposite ends, which consists in assembling certain of the needles in one cylinder, and intervening needles in the other cylinder during a portion of the revolution of the cylinders, and feeding a body thread to the needles in both cylinders to form rib work, transferring all of the needles of one cylinder to the other cylinder during another portion of the revolution of said cylinders, and while all the needles are in the one cylinder effecting a needle separation of spaced selected needles, and feeding thereto an elastic thread floating said elastic thread on the inner face of the fabric and across the inner faces of intervening inner rib wales of the fabric, and then restoring to the other cylinder the needles transferred therefrom, and then knitting one or more courses without effecting said needle separation so that the elastic thread will not be fed to any of the needles, the elastic thread being retained at the last wale in the preceding course in which it is incorporated and passing the hooks of the needles throughout the portion of the revolution of the cylinder in which all needles are located in one of said cylinders.

4. A process of knitting a self-supporting rib top for an article of hosiery by means of a knitting machine having opposed co-axial cylinders and needles provided with hooks at opposite ends, which consists in assembling a portion of the needles in one cylinder and intervening needles in the other cylinder and feeding a body thread to the needles of both cylinders and knitting rib work during a portion of the revolution of the said cylinders, and during another portion of the revolution of the said cylinders transferring all of the needles from the upper cylinder to the lower cylinder, effecting a needle separation by bringing spaced selected needles of the lower cylinder needles at a higher elevation than adjacent needles and feeding the elastic thread to said spaced selected needles below the latches thereof, and floating said elastic thread on the inner face of the fabric and across the inner faces of intervening inner rib wales thereof, and retransferring the upper cylinder needles to the upper cylinder to again receive the body thread fed to the needles of both cylinders.

5. A process of knitting a self-supporting rib top for an article of hosiery by means of a knitting machine having opposed co-axial cylinders and needles provided with hooks at opposite ends, which consists in assembling a portion of the needles in one cylinder and intervening needles in the other cylinder and feeding a body thread to the needles of both cylinders and knitting rib work during a portion of the revolution of the said cylinders, and during another portion of the revolution of the said cylinders transferring all of the needles from the upper cylinder to the lower cylinder, effecting a needle separation by bringing spaced selected needles of the lower cylinder needles at a higher elevation than adjacent needles and feeding an elastic thread to said spaced selected needles, and drawing loops of the elastic thread through the preceding loops of body thread, and floating the elastic thread on the inner face of the fabric and across the inner faces of intervening inner rib wales, then retransferring the needles of the upper cylinder thereto to receive body thread fed to the needles of both cylinders.

6. A process of knitting a self-supporting rib top for an article of hosiery by means of a knitting machine having opposed co-axial cylinders and needles provided with hooks at opposite ends, which consists in assembling a portion of the needles in one cylinder and intervening needles in the other cylinder and feeding a body thread to the needles of both cylinders and knitting rib work during a portion of the revolution of the said cylinders, and during another portion of the revolution of the said cylinders transferring all of the needles from the upper cylinder to the lower cylinder, effecting a needle separation by bringing spaced selected needles of the lower cylinder needles at a higher elevation than adjacent needles and feeding an elastic thread in the hooks thereof, and floating the elastic thread on the inner face of the fabric across the inner faces of intervening rib wales, then retransferring the needles of the upper cylinder thereto to receive the body thread fed to the needles of both cylinders including the selected needles of the lower cylinder having the elastic thread in their hooks.

7. A process of knitting a self-supporting rib top for an article of hosiery by means of a knitting machine having opposed co-axial cylinders and needles provided with hooks at opposite ends, which consists in assembling a portion of the needles in one cylinder and intervening needles in the other cylinder and feeding a body thread to the needles of both cylinders and knitting rib work during a portion of the revolution of the said cylinders, and during another portion of the revolution of the said cylinders transferring all of the needles from the upper cylinder to the lower cylinder, effecting a needle separation by bringing spaced selected needles of the lower cylinder needles at a higher elevation than adjacent needles and feeding an elastic thread, and floating it on the inner face of the fabric between said selected needles and across intervening inner rib wales of the fabric, transferring the upper cylinder needles to the upper cylinder to again receive the body thread fed to the needles of both cylinders and knitting one or more intervening courses without effecting said needle selection and without feeding elastic thread to any of the needles, the elastic thread extending from the last wale of the preceding course containing it, over the hooks of all the needles, while located in the lower cylinder.

8. A process of knitting a self-supporting rib top for an article of hosiery by means of a knitting machine having opposed co-axial cylinders and needles provided with hooks at opposite ends, which consists in assembling a portion of the needles in one cylinder and intervening needles in the other cylinder and feeding a body thread to the needles of both cylinders and knitting rib work during a portion of the revolution of the said cylinders, and during another portion of the revolution of the said cylinders transferring all of the needles from the upper cylinder to the lower cylinder, drawing down all of said needles successively and effecting a needle separation by drawing down spaced selected needles of the lower cylinder series less rapidly than the adjacent needles to bring said selected needles at a higher level than the adjacent needles, and feeding to said selected needles an elastic thread and floating said thread on the inner face of the fabric between said selected needles and across the inner faces of intervening inner rib wales bringing said needles to a common level to place the non-selected needles on the inner side of the floated portions of said elastic thread and retransferring the needles of the upper cylinder thereto to again receive body thread fed to the needles of both cylinders.

9. A process of knitting a self-supporting rib top for an article of hosiery by means of a knitting machine having opposed co-axial cylinders and needles provided with hooks at opposite ends, which consists in assembling a portion of the needles in one cylinder and intervening needles in the other cylinder and feeding a body thread to the needles of both cylinders and knitting rib work during a portion of the revolution of the said cylinders, and during another portion of the revolution of the said cylinders transferring all of the needles from the upper cylinder to the lower cylinder, drawing down all of said needles successively and effecting a needle separation by drawing down spaced selected needles of the lower cylinder series less rapidly than the adjacent needles to bring said selected needles at a higher level than the adjacent needles, and feeding to said selected needles an elastic thread and floating said thread on the inner face of the fabric between said selected needles and across the inner faces of intervening inner rib wales bringing said needles to a common level to place the non-selected needles on the outer side of the floated portions of said elastic thread and retransferring the needles of the upper cylinder thereto to again receive body thread fed to the needles of both cylinders and knitting one or more successive courses in which all of the needles after the transferring of the upper cylinder needles to the lower cylinder needles are drawn down at the same speed and the elastic thread is not fed to any of the needles, the elastic thread during such course or courses extending from the last wale of the preceding course in which it occurs, over the hooks of all of said needles, while in the lower cylinder.

10. A process of knitting a self-supporting rib knit top for an article of hosiery by means of a circular knitting machine, having a series of needles operable at one side of the fabric to knit the outer wales thereof, and a second series of needles operable at the opposite side of the fabric to knit the inner wales thereof, which comprises transferring one series of needles to bring all of the needles to the same side of the fabric, effecting a needle separation of spaced selected needles, feeding an elastic thread to the selected needles and floating said elastic thread on the inner face of the fabric across intervening inner wales thereof, transferring the needles of one series only to the opposite side of the fabric and feeding body thread to the needles of both series.

11. In a process of knitting a self-supporting rib knit top for an article of hosiery by means of a circular knitting machine having a series of needles operable at one side of the fabric to knit the outer wales thereof, and a second series of needles operable at the opposite side of the fabric to knit the inner wales thereof, the steps of feeding a continuous elastic thread to spaced selected needles and floating said elastic on the inner face of the fabric across intervening inner wales thereof during the knitting of spaced courses only, holding the elastic thread without feeding it to any of the needles during the knitting of the intervening courses and transferring one series of the needles during the knitting of each of said intervening courses to bring all of the needles to the same side of the fabric at the point at which the elastic is held.

PAUL L. THURSTON.
LEON B. WILCOX.